(12) United States Patent
Hwang (10) Patent No.: US 9,855,916 B2
(45) Date of Patent: Jan. 2, 2018

(54) ACTIVE HOOD HINGE DEVICE FOR VEHICLES

(71) Applicants: Hyundai Motor Company, Seoul (KR); Kia Motors Corp., Seoul (KR)

(72) Inventor: In Hwang, Hwaseong-si (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 0 days.

(21) Appl. No.: 15/151,756

(22) Filed: May 11, 2016

(65) Prior Publication Data

US 2016/0272146 A1 Sep. 22, 2016

Related U.S. Application Data

(62) Division of application No. 14/326,089, filed on Jul. 8, 2014, now Pat. No. 9,366,066.

(30) Foreign Application Priority Data

Dec. 17, 2013 (KR) .......................... 10-2013-0157633

(51) Int. Cl.

| | | |
|---|---|---|
| E05D 11/10 | (2006.01) | |
| B60R 21/38 | (2011.01) | |
| E05D 11/00 | (2006.01) | |
| E05D 3/16 | (2006.01) | |
| E05D 7/10 | (2006.01) | |
| G06F 1/16 | (2006.01) | |

(52) U.S. Cl.
CPC ................ B60R 21/38 (2013.01); E05D 3/16 (2013.01); E05D 7/1066 (2013.01); E05D 11/00 (2013.01); G06F 1/16 (2013.01); *E05D 2011/009* (2013.01); *E05Y 2900/536* (2013.01); *Y10T 16/529* (2015.01)

(58) Field of Classification Search
CPC . E05D 11/10; E05D 11/1007; E05D 11/1014; B60R 21/38; B60R 21/34
See application file for complete search history.

(56) References Cited

U.S. PATENT DOCUMENTS

| | | | | |
|---|---|---|---|---|
| 6,257,657 | B1 * | 7/2001 | Sasaki | B60R 21/013 180/69.21 |
| 7,506,716 | B1 * | 3/2009 | Salmon | B60R 21/38 180/274 |

(Continued)

FOREIGN PATENT DOCUMENTS

| | | | | |
|---|---|---|---|---|
| CZ | DE 102005049641 | A1 * | 6/2006 | B60R 21/34 |
| DE | 3917967 | A1 * | 8/1990 | E05D 3/145 |

(Continued)

*Primary Examiner* — Emily Morgan
(74) *Attorney, Agent, or Firm* — Morgan, Lewis & Bockius LLP (57) ABSTRACT

Disclosed is an active hood hinge device for vehicles. The active hood hinge device includes an actuator bracket rotatably coupled to a mounting bracket of a vehicle body at one side, a locking lever rotatably coupled to the actuator bracket and driven by an operating force of an actuator, a long link rotatably coupled to the actuator bracket, and unfolded and rotated from the actuator bracket by a rotating force of the locking lever, and a hood bracket rotatably coupled with the long link and fixedly coupled to a hood panel at opposite sides.

2 Claims, 9 Drawing Sheets

(56) References Cited

U.S. PATENT DOCUMENTS

| | | | |
|---|---|---|---|
| 2005/0283948 A1* | 12/2005 | Hyde | E05D 7/1061 16/361 |
| 2007/0080010 A1* | 4/2007 | Gust | B60R 21/38 180/69.2 |
| 2010/0024162 A1* | 2/2010 | Walz | B60R 21/38 16/233 |
| 2014/0359974 A1* | 12/2014 | Agell Merino | B60R 21/38 16/319 |

FOREIGN PATENT DOCUMENTS

| | | | | |
|---|---|---|---|---|
| DE | 102005049641 A1 | 6/2006 | | |
| DE | 102006002338 A1 * | 7/2007 | ............. | B60R 21/34 |
| DE | 10314180 B4 * | 4/2008 | ............. | B60R 21/38 |
| DE | 102006058501 A1 * | 6/2008 | ............. | E05D 3/145 |
| DE | 19712961 B4 * | 7/2009 | ............. | B60R 21/38 |
| DE | 102008058186 A1 * | 5/2010 | ............. | B60R 21/38 |
| DE | 102009040416 A1 * | 3/2011 | ............. | B60R 21/38 |
| DE | 102010029719 A1 * | 12/2011 | ............. | B60R 21/38 |
| DE | 19758961 B4 * | 2/2014 | ............. | B60R 21/38 |
| EP | 2364886 A1 | 9/2011 | | |
| ES | EP 2364886 A1 * | 9/2011 | ............. | B60R 21/38 |
| JP | 3377763 B2 | 2/2003 | | |
| JP | 2009506936 A | 2/2009 | | |
| JP | 2009-274498 A | 11/2009 | | |
| KR | 10-0618300 B1 | 8/2006 | | |
| KR | 10-0774772 B1 | 11/2007 | | |
| KR | 102013001805 A | 2/2013 | | |

* cited by examiner

FIG. 1

(Related Art)

ACTIVE HOOD HINGE DEVICE FOR VEHICLES

The present application is a Divisional of U.S. patent application Ser. No. 14/326,089, filed Jul. 8, 2014, which claims priority of Korean Patent Application Number 10-2013-0157633 filed on Dec. 17, 2013, the entire contents of which applications are incorporated herein for all purposes by these references.

BACKGROUND OF INVENTION

Field of Invention

The present invention relates, in general, to an active hood hinge device for vehicles and more particularly, to an active hood hinge device for vehicles which, when a pedestrian is hit by a vehicle, allows a hood bracket to increase in a lifting distance, thereby improving protection of struck pedestrians, while allowing an actuator to be made compact, thereby being applicable to compact vehicles.

Description of Related Art

Generally, active hood hinge devices are mounted to connect a hood panel for covering an engine room to a vehicle body at both rear lateral sides of the hood panel. When a pedestrian is accidentally hit by a vehicle, the active hood hinge device allows the rear side of the hood panel to lift in order to prevent the head of a pedestrian from colliding directly with the engine, transmission, or other rigid part of the vehicle.

Figure 1:
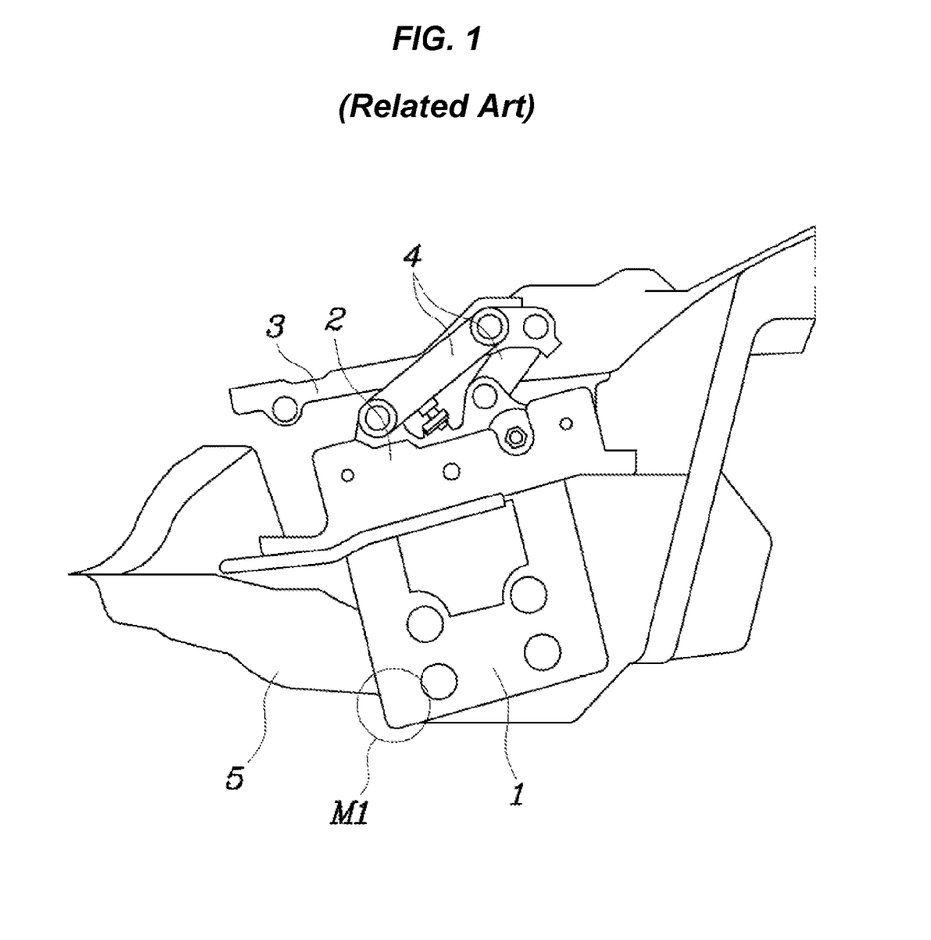
FIG. 1 is a view showing a conventional active hood hinge device installed in a vehicle, which is not yet operated.
Figure 2:
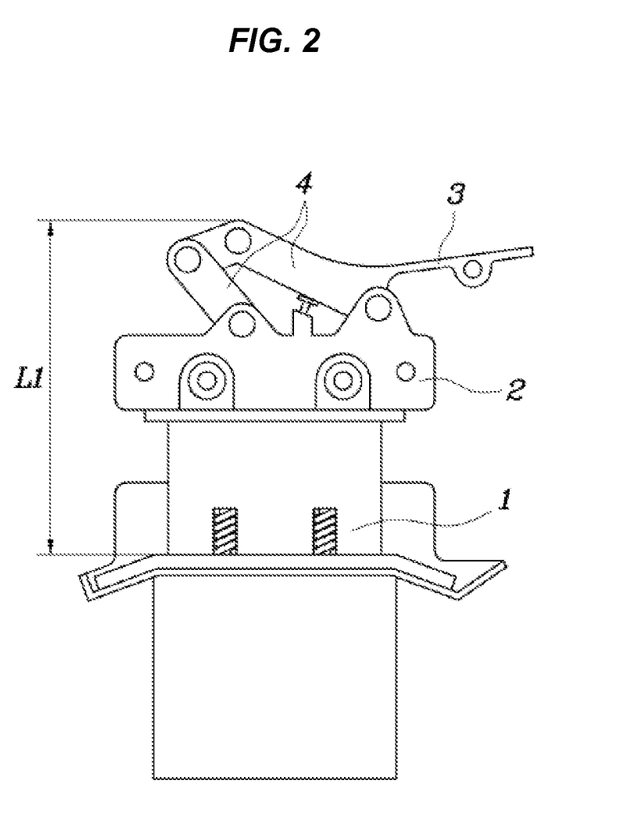
FIG. 2 is a view of the conventional active hood hinge device after operation.

A conventional active hood hinge device is shown in FIGS. 1 and 2. In the figures, the structure of the conventional active hood hinge device is such that an actuator 1 and an actuator bracket 2 are directly coupled together, and a hood bracket 3 which is coupled to a hood panel is connected with the actuator bracket 2 by means of a plurality of connection links 4. However, the conventional active hood hinge device has a problem in that, because the actuator 1 directly operates the actuator bracket 2, a lifting distance L1 of the hood bracket 3 according to the operation of the actuator 1 is not large, thus insufficient to protect a pedestrian.

Further, since the capacity and therefore the size of the actuator 1 should be large in order for the actuator 1 to directly operate the actuator bracket 2, it is difficult to install the conventional actuator 1 having a large size in a vehicle due to interference with a cowl panel 5 at a section thereof (e.g. M1 in FIG. 1), making it impossible to be applicable to compact vehicles.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Accordingly, the present invention has been made keeping in mind the above problems occurring in the related art and/or other problems, and the present invention is intended to provide an active hood hinge device for vehicles which, when a pedestrian is accidentally hit by a vehicle, allows a hood bracket to increase in a lifting distance according to the operation of an actuator, thereby further improving protection of pedestrians, while allowing the actuator to be made compact owing to the increased lifting distance of the hood bracket, thereby being applicable to compact vehicles.

In order to solve the above and/or other problems, in various aspect, the present invention provides an active hood hinge device for vehicles, including: an actuator bracket rotatably coupled to a mounting bracket of a vehicle body at one side thereof, a locking lever rotatably coupled to the actuator bracket, wherein the locking lever is driven by an operating force of an actuator, a long link rotatably coupled to the actuator bracket, wherein the long link is unfolded and rotated from the actuator bracket by a rotating force of the locking lever, and a hood bracket rotatably coupled with the long link and fixedly coupled to a hood panel at opposite sides thereof.

The active hood hinge device may further include a short link engaged with the locking lever at one side thereof and rotatably coupled to the hood bracket at the other side thereof, wherein the short link is configured to restrict a motion of the locking lever to maintain an initial state of the locking lever when the actuator is not operated, and to be disconnected from the locking lever to allow the locking lever to rotate when the actuator is operated.

The locking lever may have a substantially-circular integral lever-engaging protrusion for connection with the short link, and the short link may have a link-engaging shaft to be engaged with the lever-engaging protrusion.

The active hood hinge device may further include a stopper bracket rotatably coupled to the actuator bracket, wherein the stopper bracket is configured to restrict a motion of the locking lever to maintain an initial state of the locking lever when the actuator is not operated, and to be disconnected from the locking lever so that the stopper bracket rotates when the locking lever rotates as the actuator is operated.

The locking lever and the stopper bracket may respectively have a lever protrusion and a bracket protrusion that engage with each other. The locking lever may be configured to come into contact with the actuator bracket to rotate the actuator bracket when the locking lever is disconnected from the short link and the stopper bracket and rotates as the actuator is operated, thereby rotating the long link to lift up the hood bracket. The actuator bracket may be integrally provided with a bracket contact for contact with the locking lever that is rotating.

The locking lever may be configured to come into contact with the long link to rotate the long link to lift up the hood bracket when the locking lever is disconnected from the short link and the stopper bracket and rotates as the actuator is operated. The long link may be integrally provided with a link contact for contact with the locking lever that is rotating.

The long link and the actuator bracket may respectively have a link fixing shaft and a shaft-engaging protrusion to be engaged with the link fixing shaft, to maintain a lifting motion of the hood bracket when the hood bracket is being lifted up as the long link rotates with the operation of the actuator. The long link and the stopper bracket may respectively have a link fixing protrusion and a stopper protrusion to be engaged with the link fixing protrusion, to maintain a lifting motion of the hood bracket when the hood bracket is being lifted up as the long link rotates with the operation of the actuator.

The active hood hinge device may further include a stopper protrusion coupled with the mounting bracket and engaged with a bottom-opened lever groove formed in the locking lever, thereby restricting a motion of the locking lever to maintain an initial state of the locking lever when the actuator is not operated.

The actuator may include a linear cylinder substantially vertically arranged while passing through the mounting bracket, and an operating rod moving along the cylinder.

According to the present invention, the configuration is such that the actuator actuates the locking lever, which in turn actuates the actuator bracket, to which the locking lever is connected by means of the link structure, finally lifting up the hood bracket, thereby considerably increasing a lifting distance of the hood bracket and thus minimizing a struck pedestrian's injuries, while allowing a compact-size actuator to be used due to increased lifting distance, thereby contributing to reduced weight and easy installation, as well as adaptation to compact vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The above and other objects, features and advantages of the present invention will be more clearly understood from the following detailed description when taken in conjunction with the accompanying drawings, in which.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

As shown in FIGS. 3 to 5B, an active hood hinge device according to an embodiment includes: an actuator bracket 20 which is rotatably coupled to a mounting bracket 10 of a vehicle body at one side thereof, a locking lever 40 which is rotatably coupled to the actuator bracket 20, wherein the locking lever is driven by an operating force of an actuator 30, a long link 50 which is rotatably coupled to the actuator bracket 20, wherein the long link is unfolded and rotated from the actuator bracket 20 with a rotating force of the locking lever 40, and a hood bracket 60 which is rotatably coupled with the long link 50 and fixedly coupled to a hood panel 61 at opposite sides thereof.

The active hood hinge device further includes a short link 70 which is engaged with the locking lever 40 at one side thereof and is rotatably coupled to the hood bracket 60 at the other side thereof, wherein the short link is configured to, when the actuator 30 is not operated, restrict a motion of the locking lever 40 to maintain an initial state of the locking lever, and to, when the actuator 30 is operated, be disconnected from the locking lever 40 to allow the locking lever 40 to rotate smoothly.

The locking lever 40 has a circular or substantially circular integral lever-engaging protrusion 41 for connection with the short link 70, and the short link 70 has a link-engaging shaft 71 to be engaged with the lever-engaging protrusion 41.

The actuator 30 is provided with a linear cylinder 31 which is vertically or substantially vertically arranged while passing through the mounting bracket 10, and an operating rod 32 which moves along the cylinder 31. The operating rod 32 is configured to come into contact with and rotate the locking lever 40.

The active hood hinge device further includes a stopper bracket 80 which is rotatably coupled to the actuator bracket 20, wherein the stopper bracket is configured to, when the actuator 30 is not operated, restrict a motion of the locking lever 40 to maintain an initial state of the locking lever, and to, when the locking lever 40 rotates as the actuator 30 is operated, be disconnected from the locking lever 40 so that the stopper bracket rotates. The locking lever 40 and the stopper bracket 80 respectively have a lever protrusion 42 and a bracket protrusion 81 that engage with each other.

In an embodiment, the locking lever 40 is configured to, when the locking lever 40 is disconnected from the short link 70 and the stopper bracket 80 and rotates as the actuator 30 is operated, come into contact with the actuator bracket 20 to rotate the actuator bracket 20 and resultantly the long link 50 so as to lift up the hood bracket 60. To this end, the actuator bracket 20 is integrally provided with a bracket contact 21 for contact with the locking lever 40 that is rotating.

In an embodiment, the long link 50 and the actuator bracket 20 respectively have a link fixing shaft 51 and a shaft-engaging protrusion 22 to be engaged with the link fixing shaft 51, in order to maintain a lifting motion of the hood bracket 60 when lifted up as the long link 50 rotates with the operation of the actuator 30.

In FIGS. 3 to 5B, reference numeral 91 denotes a hinge axis that is the center of rotation of the actuator bracket 20, reference numeral 92 denotes a hinge axis that is the center of rotation of the locking lever 40, reference numeral 93 denotes a hinge axis that is the center of rotation of the long link 50, reference numeral 94 denotes a hinge axis that is the center of rotation of the hood bracket 60, reference numeral 95 denotes a hinge axis that is the center of rotation of the short link 70, and reference numeral 96 denotes a hinge axis that is the center of rotation of the stopper bracket 80.

The operation of the embodiment will now be described.

Figure 3:
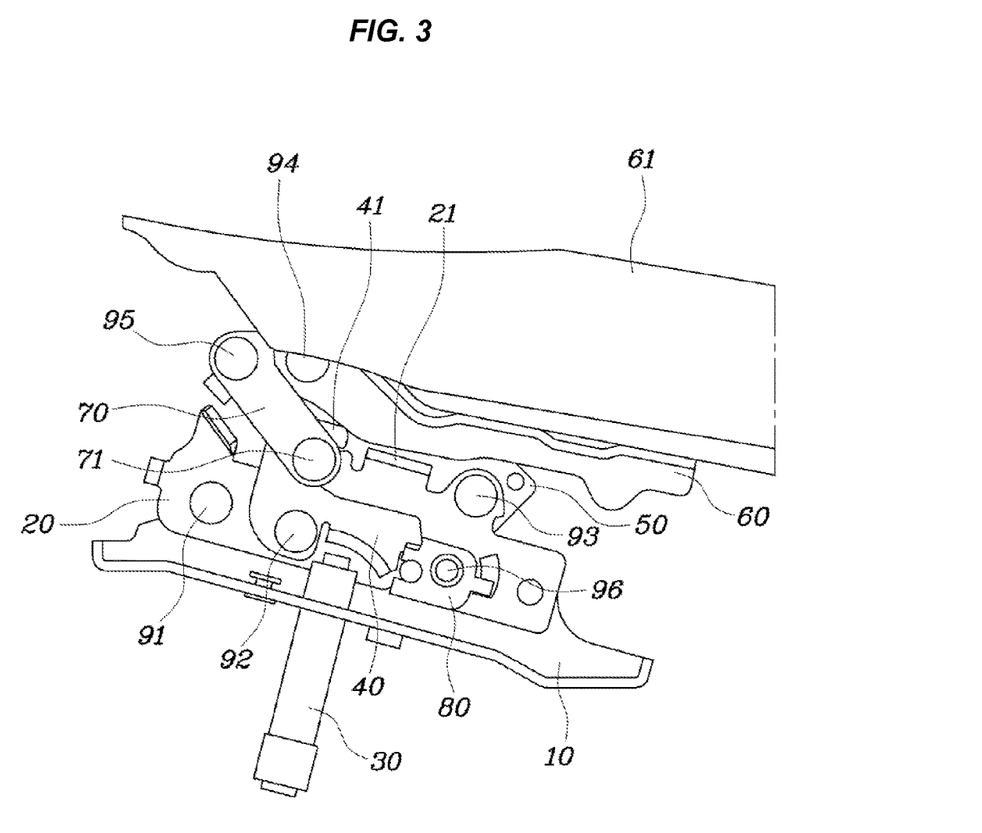
FIG. 3 is a view showing an exemplary active hood hinge device for vehicles before operation according to the present invention.

FIG. 3 shows the state before the actuator 30 is operated. Here, the locking lever 40 maintains the connection with the short link 70 and the stopper link 80, so that the actuator bracket 20, the long link 50, and the hood bracket 60 are folded and overlap together.

Figure 4:
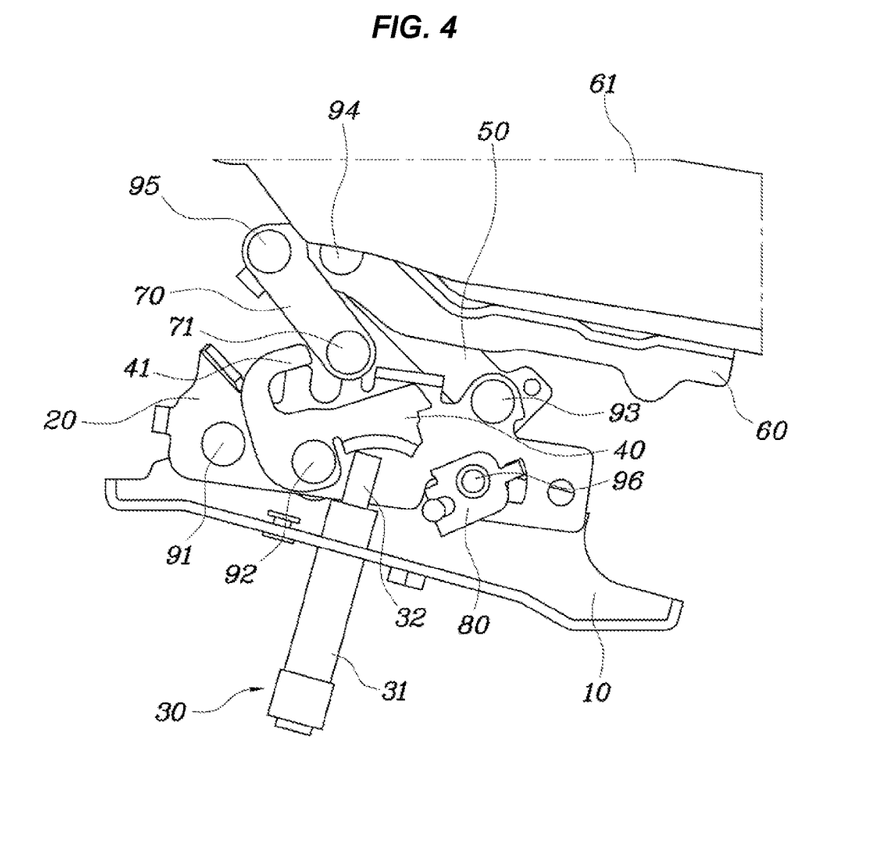
FIG. 4 is a view showing an exemplary active hood hinge device for vehicles in use according to the present invention.

FIG. 4 shows the state during operation. That is, when a vehicle collides with a pedestrian in the state before operation like in FIG. 3, a controller operates the actuator 30 so that the operating rod 32 of the actuator 30 moves along the cylinder 31 to pressurize the locking lever 40. Then, the locking lever 40 rotates counterclockwise about the hinge axis 92 and is disconnected from the short link 70 as well as from the stopper bracket 80, so that the locking lever 40 comes into contact with the bracket contact 21 of the actuator bracket 20.

Figure 5A:
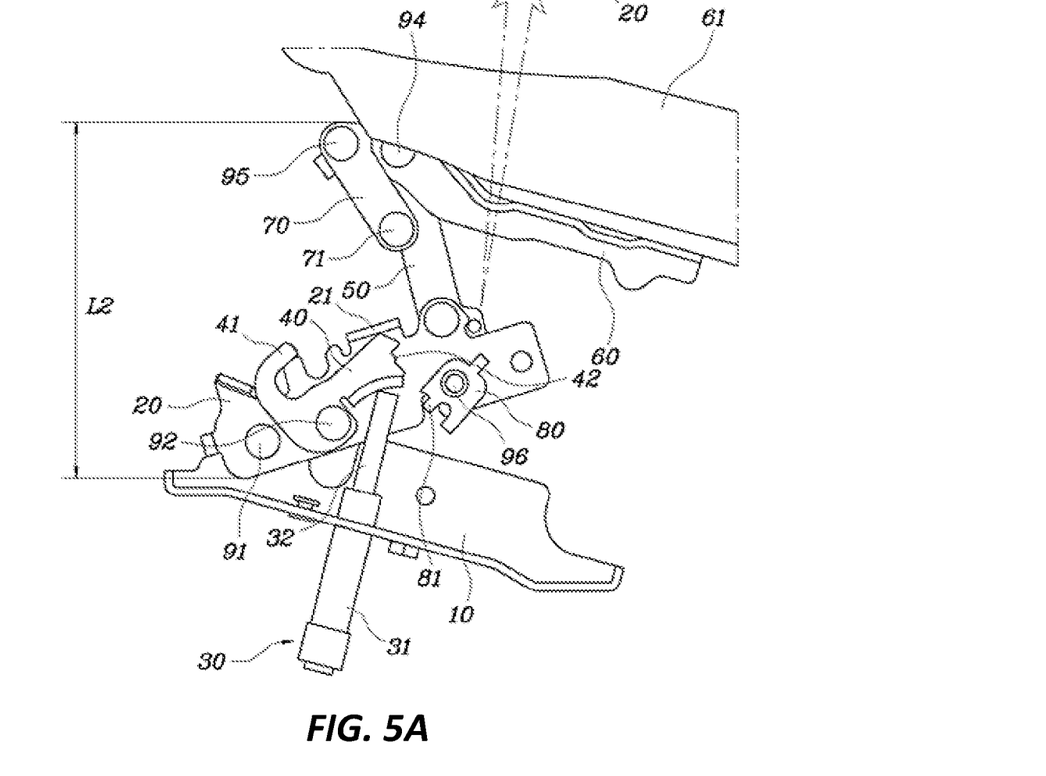
FIG. 5A is a view showing an exemplary active hood hinge device for vehicles after operation according to the present invention.
Figure 5B:
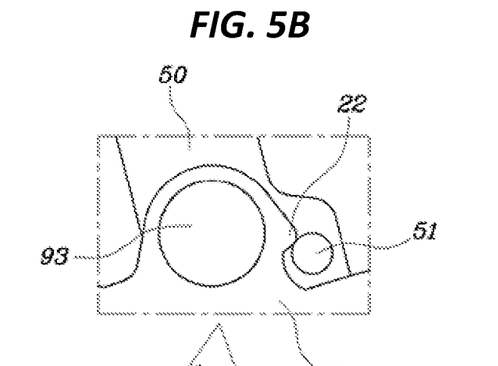
FIG. 5B is a partially enlarged view of FIG. 5A.

FIGS. 5A and 5B show the state after operation. That is, when the locking lever 40 pressurizes the actuator bracket 20 with continuous rotating action in the state of FIG. 4, the actuator bracket 20 rotates counterclockwise about the hinge axis 91 and thus moves away from the mounting bracket 10 of a vehicle, as the actuator bracket 20 rotates, the long link 50 rotates clockwise about hinge axis 93 and thus moves away from the actuator bracket 20, and as the long link 50 rotates, the hood bracket 60 rotates counterclockwise about the hinge axis 94. As a result, the hood panel 61, which is coupled with the hood bracket 60, is lifted up.

When the lifting action of the hood bracket 60 is completed as shown in FIGS. 5A and 5B, the fixing shaft-engaging protrusion 22 is engaged with the link-fixing shaft 51, so the lifted state of the hood bracket 60 can be continuously maintained, thereby minimizing vibrations of the hood panel 61 and therefore reducing pedestrian's injuries.

Figure 6:
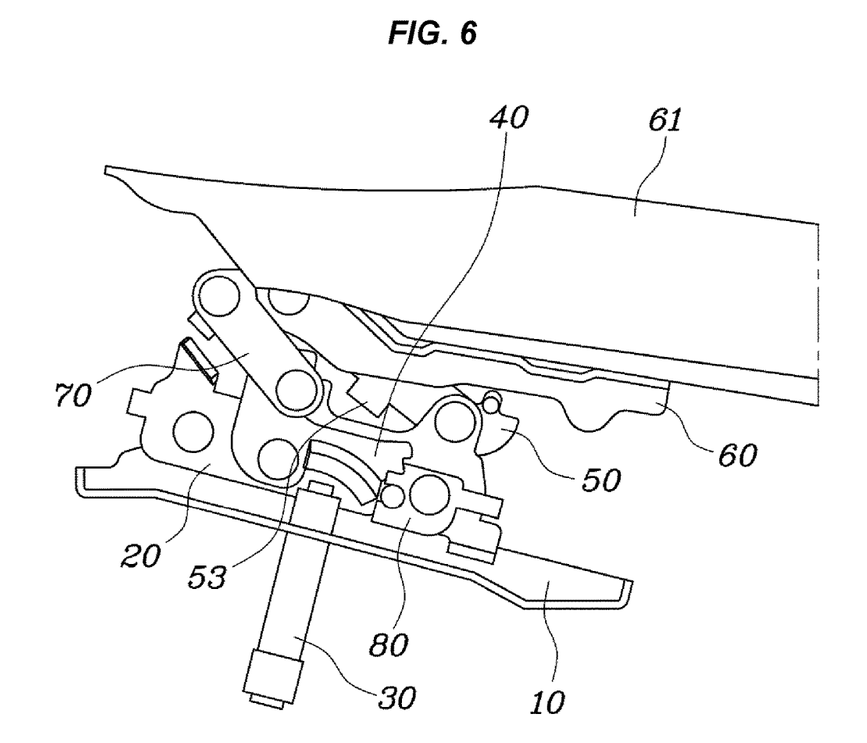
FIG. 6 is a view showing another exemplary active hood hinge device for vehicles before operation according to the present invention.
Figure 7:
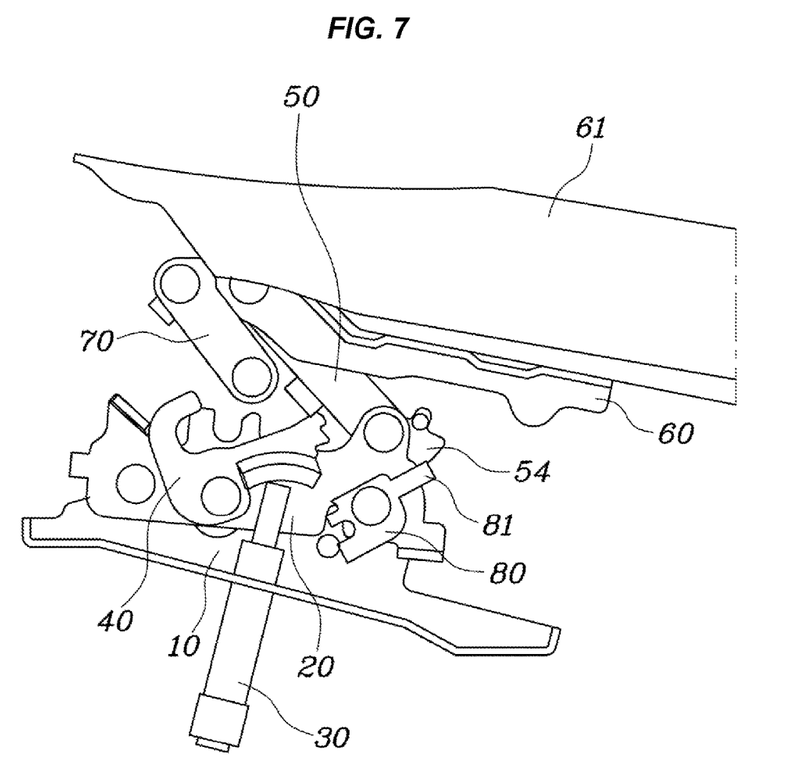
FIG. 7 is a view showing another exemplary active hood hinge device for vehicles in use according to the present invention.
Figure 8:
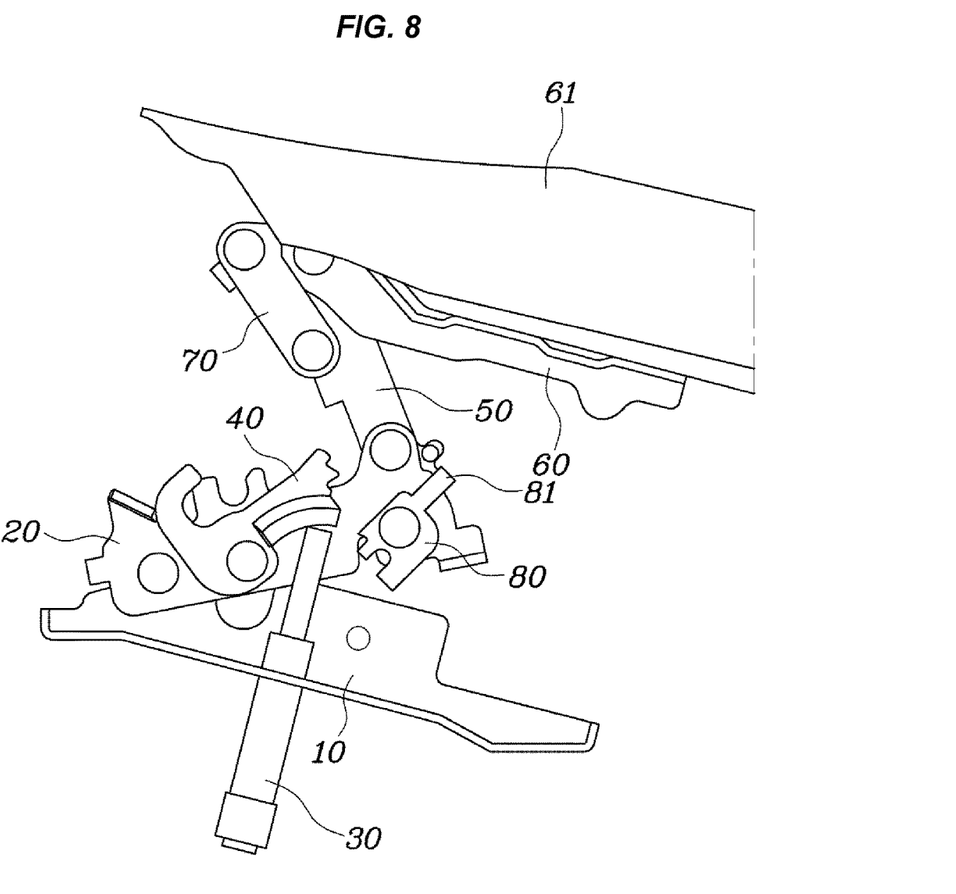
FIG. 8 is a view showing another exemplary active hood hinge device for vehicles after operation according to the present invention.

In the meantime, FIGS. 6 to 8 show an active hood hinge device for vehicles according to another embodiment of the present invention. Hereinafter, only the different structure and operation of the embodiment with respect to the former embodiment shown in FIGS. 3 to 5B will be described. In addition, the configuration and mounting structure of the actuator 30 are the same as in the embodiment of FIGS. 3 to 5B.

In the present embodiment, the locking lever 40 is configured to, when the locking lever 40 is disconnected from the short link 70 and the stopper bracket 80 and rotates as the actuator 30 is operated, come into contact with the long link 50 to rotate the long link 50 so as to lift up the hood bracket 60. To this end, the long link 50 is integrally provided with a link contact 53 for contact with the locking lever 50 that is rotating.

Further, the long link 50 and the stopper bracket 80 respectively have a link fixing protrusion 54 and a stopper protrusion 81 to be engaged with the link fixing protrusion 54, in order to maintain a lifting motion of the hood bracket 60 when lifted up as the long link 50 rotates with the operation of the actuator 30.

That is, the configuration is such that, when the locking lever 40 rotates with the operation of the actuator 30, the locking lever 40 comes into contact with the link contact 53 of the long link 50 and then rotates the long link 50, and as the long link 50 rotates, the actuator bracket 20 and the hood bracket 60 rotate at the same time, so the hood bracket 60 is finally lifted up.

Further, when the lifting action of the hood bracket 60 is completed as shown in FIG. 8, the link-fixing protrusion 54 is engaged with the stopper protrusion 81, so the lifted state of the hood bracket 60 can be continuously maintained.

Figure 9:
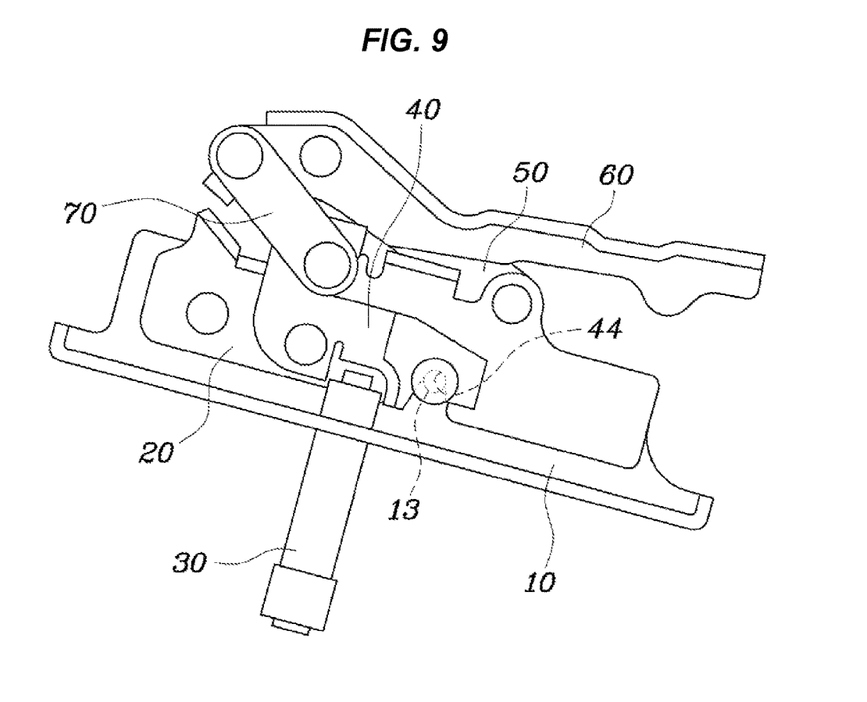
FIG. 9 is a view showing an exemplary active hood hinge device for maintaining an initial state of a locking lever according to the present invention.

FIG. 9 shows a further embodiment for maintaining an initial stage of the locking lever. Although FIGS. 3 to 8 use the stopper bracket 80 for maintaining the initial state of the locking lever 40, the present embodiment employs a stopper protrusion 13. That is, the stopper protrusion 13 is coupled with the mounting bracket 10 while passing through the actuator bracket 20 and the locking lever 40 is provided with a bottom-opened lever groove 44 to be engaged with the stopper protrusion 13, in order to maintain the initial state of the locking lever 40 obtained when restricted as the actuator 30 is not operated.

Thus, when the locking lever 40 rotates with the operation of the actuator 30, the stopper protrusion 13 is disconnected from the lever groove 44 of the locking lever 40 so that the locking lever 40 rotates, and the actuator bracket 20, the long link 50, and the hood bracket 60 rotate, so the hood bracket 60 is finally lifted up.

According to the present invention, the configuration is such that the actuator 30 actuates the locking lever 40, which in turn actuates the actuator bracket 20, to which the locking lever 40 is connected by means of the link structure, finally lifting up the hood bracket 60, thereby considerably increasing a final lifting distance L2 of the hood bracket 60 compared to the related art and thus sufficiently protecting a pedestrian and minimizing a pedestrian's injuries in the case of a collision accident.

Further, according to the present invention, the final lifting distance L2 of the hood bracket 60 is considerably increased, so a compact-size actuator 30 can be used, thereby contributing to reduced weight and easy installation, as well as adaptation to compact vehicles.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An active hood hinge device for vehicles, comprising:
    an actuator bracket rotatably coupled to a mounting bracket of a vehicle body at one side thereof;
    a locking lever rotatably coupled to the actuator bracket, wherein the locking lever is driven by an operating force of an actuator;
    a long link rotatably coupled to the actuator bracket, wherein the long link is unfolded and rotated from the actuator bracket by a rotating force of the locking lever;
    a hood bracket rotatably coupled with the long link and fixedly coupled to a hood panel at opposite sides thereof;
    a short link engaged with the locking lever at one side thereof and rotatably coupled to the hood bracket at the other side thereof, wherein the short link is configured to restrict a motion of the locking lever to maintain an initial state of the locking lever when the actuator is not operated, and to be disconnected from the locking lever to allow the locking lever to rotate when the actuator is operated; and a stopper bracket rotatably coupled to the actuator bracket, wherein the stopper bracket is configured to restrict a motion of the locking lever to maintain an initial state of the locking lever when the actuator is not operated and to be disconnected from the locking lever so that the stopper bracket rotates when the locking lever rotates as the actuator is operated, wherein the locking lever is configured to come into contact with the long link to rotate the long link to lift up the hood bracket when the locking lever is disconnected from the short link and the stopper bracket and rotates as the actuator is operated, and wherein the long link is integrally provided with a link contact for contact with the locking lever that is rotating.

2. An active hood hinge device for vehicles, comprising:

an actuator bracket rotatably coupled to a mounting bracket of a vehicle body at one side thereof;

a locking lever rotatably coupled to the actuator bracket, wherein the locking lever is driven by an operating force of an actuator;

a long link rotatably coupled to the actuator bracket, wherein the long link is unfolded and rotated from the actuator bracket by a rotating force of the locking lever;

a hood bracket rotatably coupled with the long link and fixedly coupled to a hood panel at opposite sides thereof;

a short link engaged with the locking lever at one side thereof and rotatably coupled to the hood bracket at the other side thereof, wherein the short link is configured to restrict a motion of the locking lever to maintain an initial state of the locking lever when the actuator is not operated, and to be disconnected from the locking lever to allow the locking lever to rotate when the actuator is operated; and a stopper bracket rotatably coupled to the actuator bracket, wherein the stopper bracket is configured to restrict a motion of the locking lever to maintain an initial state of the locking lever when the actuator is not operated, and to be disconnected from the locking lever so that the stopper bracket rotates when the locking lever rotates as the actuator is operated, wherein the long link and the stopper bracket respectively have a link fixing protrusion and a stopper protrusion to be engaged with the link fixing protrusion, to maintain a lifting motion of the hood bracket when the hood bracket is being lifted up as the long link rotates with the operation of the actuator.

\* \* \* \* \*